United States Patent [19]

Wright

[11] 4,099,742

[45] Jul. 11, 1978

[54] CONTROL VALVE DEVICE FOR VEHICLE AIR SPRINGS

[75] Inventor: Raymond C. Wright, Irwin, Pa.

[73] Assignee: Westinghouse Air Brake Company, Wilmerding, Pa.

[21] Appl. No.: 693,746

[22] Filed: Jun. 8, 1976

[51] Int. Cl.² .............................................. B60G 17/10
[52] U.S. Cl. ................................. 280/714; 105/197 B; 137/596.2
[58] Field of Search ..................... 280/714; 105/197 B; 267/65 D; 137/596.2, 627.5; 251/54

[56] References Cited

U.S. PATENT DOCUMENTS

| 2,895,752 | 7/1959 | May ........................................ 280/714 |
| 3,296,941 | 1/1967 | Rochte .................................. 137/596.2 |
| 3,452,781 | 7/1969 | Napolitano .......................... 137/627.5 |
| 3,464,742 | 9/1969 | Cruse .................................... 137/596.2 |
| 3,480,039 | 11/1969 | Brannon ............................. 137/596.2 |
| 3,754,768 | 8/1973 | Ellis ....................................... 280/714 |
| 3,778,081 | 12/1973 | Takahashi ............................ 280/714 |
| 3,831,968 | 8/1974 | Shaffer ................................. 280/714 |
| 3,896,856 | 7/1975 | Schumacher ......................... 251/54 |
| 3,923,240 | 12/1975 | Glaze ................................. 267/65 D |

FOREIGN PATENT DOCUMENTS

| 1,142,291 | 1/1963 | Fed. Rep. of Germany ....... 280/714 |
| 1,048,463 | 11/1966 | United Kingdom ................. 280/714 |

*Primary Examiner*—Joseph F. Peters, Jr.
*Assistant Examiner*—John A. Carroll
*Attorney, Agent, or Firm*—W. F. Poore; R. W. McIntire, Jr.

[57] ABSTRACT

A mechanical or magnetic-actuated control valve device for so controlling pressure of fluid in an air spring for interposition between a sprung portion and an unsprung portion of a vehicle as to support the sprung portion at a substantially constant preselected height relative to the unsprung portion irrespective of the load carried by the sprung portion.

A supply valve and a release valve are operated by either mechanical or electro-magnetic actuators by a cam to supply fluid under pressure to or release fluid under pressure from the air spring accordingly as the cam is rocked in one direction or in an opposite direction from a neutral position.

Actuation or rocking movement of the cam in either direction from its neutral position, resulting from movement of the sprung portion relative to the unsprung portion in response to a change in the load on the vehicle, effects shifting of either the mechanical or the electro-magnetic actuators to cause operation of the proper valve to effect a change in the pressure in the air spring that is proportional to this degree of rocking and therefore the degree of change of load on the vehicle.

14 Claims, 4 Drawing Figures

CONTROL VALVE DEVICE FOR VEHICLE AIR SPRINGS

BACKGROUND OF THE INVENTION

In U.S. Pat. No. 2,893,752, issued July 7, 1959 to Harry C. May, and assigned to the assignee of the present invention, there is shown and described a control valve device for so controlling pressure of fluid in an air spring interposed between a sprung portion and an unsprung portion of a vehicle as to support the sprung portion at a substantially constant preselected height relative to the unsprung portion irrespective of the load carried by the sprung portion. This control valve device embodies a spool-type valve that controls the supply of fluid under pressure to or the release of fluid under pressure from an air spring. The periphery of this spool valve is provided with a plurality of spaced-apart peripheral annular grooves in each of which is disposed an O-ring seal. This spool valve is shiftable from one position to another within a bushing that is provided with a plurality of ports that extend therethrough and at one end open at the interior wall surface of this bushing. These ports are provided in the bushing by such as a drilling operation. Consequently, the one end of these ports constitute a sharp edge which, it has been found in actual practice, causes cutting, tearing or other damage to the O-ring seals when they are moved over or past the one end of these ports as the spool valve is shifted from one position to another position within the bushing.

Accordingly, it is the general purpose of this invention to provide a novel air spring pressure control valve device that has a disc-type supply valve and a disc-type release valve which are actuated to an open position by movement of either a piston member or a permanent magnet that is repelled by a magnetic force.

SUMMARY OF THE INVENTION

According to the present invention, a novel air spring pressure control valve device mounted on a sprung portion of a vehicle for controlling the pressure in an air spring for interposition between the sprung portion and an unsprung portion of the vehicle comprises a disc-type supply valve and a disc-type release valve that are unseated respectively by the shifting of one of either of a pair of piston members or a pair of permanent magnets when repelled by a magnetic force. This shifting of either a piston member or a permanent magnet from a neutral position is effected in response to arcuate movement of a cam in one direction or in an opposite direction in accordance with an increase or a decrease in the load on the sprung portion of the vehicle.

Figure 1:
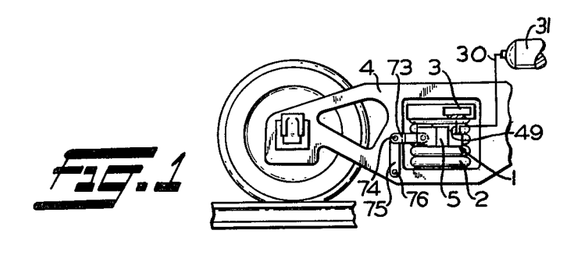
FIG. 1 is an elevational view, partly in section, of a control valve device embodying the invention shown associated with a sprung and an unsprung portion of a vehicle and a source of fluid supply.
Figure 2:
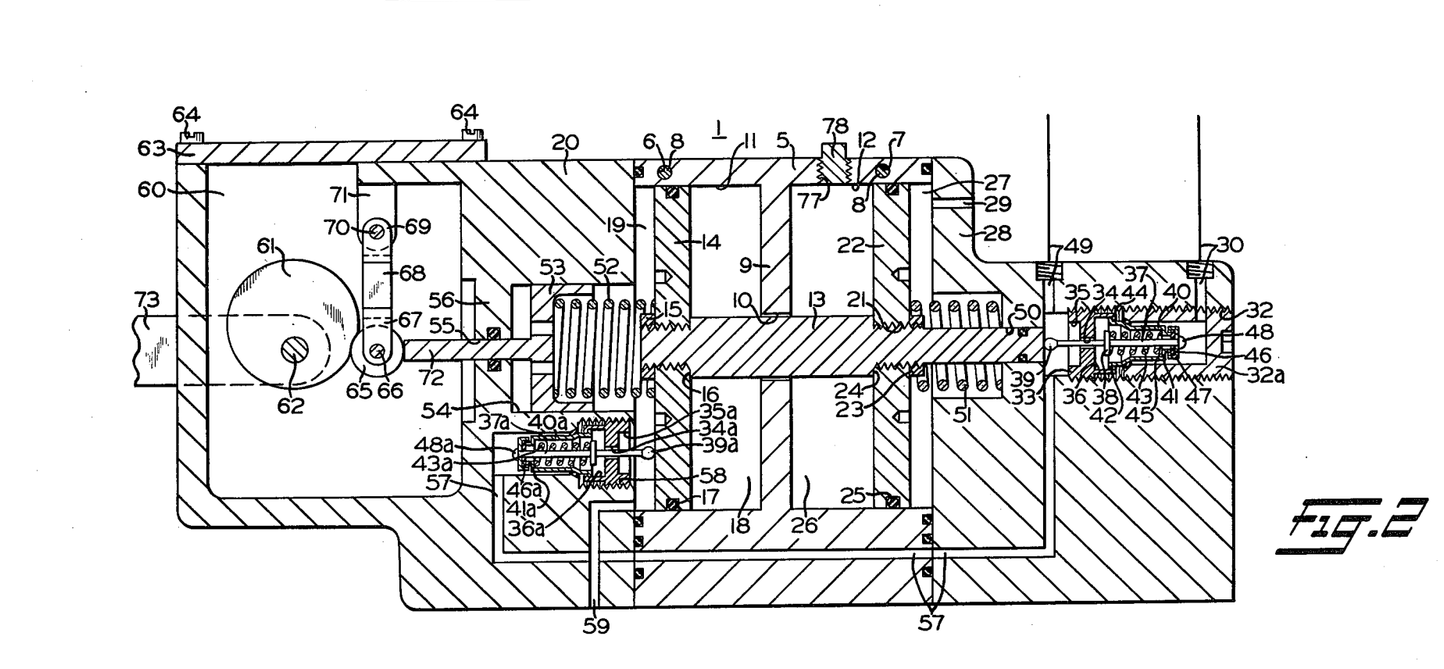
FIG. 2 is an enlarged vertical sectional view of a control valve device of the type shown in outline in FIG. 1 and constituting a first embodiment of the invention.

DESCRIPTION — FIGS. 1 AND 2

Referring to FIG. 1 of the drawings, a control valve device 1 constituting a first embodiment of the invention is shown for controlling the pressure of a fluid in an air spring 2 that at its upper end operatively bears against a sprung portion, such as a bolster 3 of a railway vehicle, and at its lower end against an unsprung portion, such as a truck side frame 4, so as to cause the air spring 2 to maintain the sprung portion 3 at a substantially constant height above and relative to the unsprung portion 4. A casing 5 of the valve device 1 is provided with a pair of spaced-apart smooth bores 6 and 7 (FIG. 2) through which may pass as, for example, a pair of cap screws 8 by which the casing 5 may be secured to any suitable sprung part of the railway vehicle.

As shown in FIG. 2 of the drawings, the casing 5 is provided with a wall 9 through which extends a bore 10 the respective opposite ends of which open into coaxial counterbores 11 and 12 that extend inward from the respective opposite ends of the casing 5. Counterbores 11 and 12 have the same diameter.

Extending through the bore 10 is a piston rod 13 the left-hand end of which is provided with external screw threads for receiving thereon a first piston 14 and a lock nut 15 that forces the right-hand face of this piston 14 against a first shoulder 16 formed on the piston rod 13.

The diameter of the piston 14 is such as to provide a sliding fit between the periphery of this piston 14 and the wall surface of the counterbore 11. Moreover, the periphery of this piston 14 is provided with a peripheral annular groove in which is disposed an O-ring seal 17 that forms a seal with the wall surface of the counterbore 11 to prevent leakage of fluid under pressure between a first chamber 18, formed by the cooperative relationship of the right-hand face of the piston 14, the wall surface of the counterbore 11 and the wall 9, and a second chamber 19, formed by the cooperative relationship of the left-hand face of this piston 14, the wall surface of the counterbore 11 and an end member 20 that closes the left-hand end of the counterbore 11 and is secured to the left-hand end of the casing 5 by any suitable means (not shown).

As shown in FIG. 2, that portion of the piston rod 13 that is disposed in the counterbore 12 is provided with external screw threads 21 for receiving thereon a second piston 22 and a lock nut 23 that forces the left-hand face of the piston 22 against a second shoulder 24 formed on the piston rod 13.

The diameter of the piston 22 is such as to provide a sliding fit between the periphery of this piston 22 and the wall surface of the counterbore 12. Furthermore, the periphery of the piston 22 is provided with a peripheral annular groove in which is disposed an O-ring seal 25 that forms a seal with the wall surface of the counterbore 12 to prevent leakage from a chamber 26, formed by the cooperative relationship of the wall 9, the wall surface of the counterbore 12 and the left-hand face of the piston 22, to an atmospheric chamber 27, formed by the cooperative relationship of the right-hand face of the piston 22, the wall surface of the counterbore 12 and an end member 28 that closes the right-hand end of the counterbore 12 and is secured to the right-hand of the casing 5 by any suitable means (not shown). A port 29 is provided in this end member 28 whereby the chamber 27 is constantly open to atmosphere.

As shown in FIG. 2, the end member 28 is provided with a supply passageway 30 one end of which is connected by a correspondingly numbered pipe to a supply reservoir 31 (FIG. 1). This passageway 30 at its opposite end opens into a counterbore 32 in which is disposed a supply valve mechanism which will now be described in detail.

As shown in FIG. 2, the greater part of the counterbore 32 is provided with internal screw threads to enable the above-mentioned supply valve mechanism to be mounted therein. This supply valve mechanism comprises a plug member 33 the left-hand end of which is provided with external screw threads that have screw-threaded engagement with the internal screw threads in the counterbore 32.

It should be understood that the supply valve mechanism is assembled as a unit in a manner now to be described prior to the plug member 33 being screw-threaded into the screw-threaded counterbore 32.

It may be seen from FIG. 2 that the plug member 33 is provided with a bore 34 that at one end opens into a first coaxial counterbore 35 that extends inward from the screw-threaded end of this plug and at the other end opens into what is originally a second coaxial counterbore 36.

Accordingly, a valve operating stem 37, having a collar 38 formed integral therewith intermediate the ends thereof, has one end inserted through the bore 34 and coaxial counterbore 35 so that the collar 38 is disposed within the counterbore 36.

This one end of the valve operating stem 37 is now peened over to form a spherical member 39 the diameter of this spherical member 39 being greater than the diameter of the bore 34.

As shown in FIG. 2, the supply valve mechanism further comprises a hollow valve seat member 40 that has an annular valve seat 41 formed at one end and an out-turned annular flange 42 at the other, the diameter of this out-turned flange 42 being slightly less than the diameter of the counterbore 36 in the plug member 33.

After a spring 43 is disposed in surrounding relation to the stem 37 so that one end of this spring 43 abuts the collar 38, the hollow valve seat member 40 is slipped over this spring 43 and the out-turned flange 42 that is integral with this valve seat member 40 is then inserted into the counterbore 36 in the plug member 33.

Next, the metal of the plug member 33 at the outer end of the counterbore 36 is turned inward, as by peening with a hammer, to form an inturned flange 44 against which the out-turned flange 42 of the valve seat member 40 is now biased by the spring 43 that is interposed between the collar 38 and a shoulder 45 on this valve seat member 40.

Now, by the application of a manual force to the spherical member 39, the valve stem 37 is pushed against the yielding resistance of the spring 43 to a position in which the end of this stem opposite the spherical member 39 will extend past the annular valve seat 41 far enough to slip a flat annular resilient valve 46 and an annular metallic cup-shaped member 47 over the protruding end of this valve stem 37.

This protruding end of the valve stem 37 is now peened over by use of a hammer to form a head 48 which serves to retain the valve 46 and cup-shaped member 47 on the stem 37.

It will be appreciated that subsequent to assembling the supply valve mechanism in the manner described above, the spring 43 is effective to bias the resilient valve 46 against the annular valve seat 41 and the out-turned flange 42 against the inturned flange 44 that is integral with the plug member 33.

Subsequent to assemblying the supply valve mechanism, the plug member 33 is screw threaded into the screw-threaded end of the counterbore 32. Then the end of the counterbore 32 is closed by a screw-threaded plug 32a.

With the valve 46 biased against the annular valve seat 41 by the spring 43, communication will be closed between the supply passageway 30 and a delivery passageway 49 in the end member 28, one end of which passageway 49 opens at the right-hand end a bore 50 in the end member 28 this bore 50 being coaxial with the counterbore 32.

As shown in FIG. 2, the right-hand end of the piston rod 13 extends into the counterbore 50 to effect unseating of the valve 46 from the valve seat 41 upon movement of the pistons 14 and 22 and the piston rod 13 in the direction of the right-hand, as viewed in FIG. 2, from the position in which they are shown.

Upon unseating of the valve 46 from the valve seat 41, fluid under pressure will flow from the supply reservoir 31 (FIG. 1) to the air spring 2 via pipe and passageway 30 (FIG. 2), past unseated valve 46, the interior of valve seat member 40, counterbore 36, bore 34, counterbore 35, and passageway 49 which is connected by a correspondingly numbered pipe to the air spring 2 (FIG. 1).

The pistons 22 and 14 and piston rod 13 are normally biased to a neutral position in which they are shown in FIG. 2 by a pair of springs 51 and 52 of equal force. The spring 51 is disposed in surrounding relation to the piston rod 13 and interposed between the piston 22 and end member 28, and the spring 52 is interposed between the piston 14 and a cup-shaped spring seat 53 which is slidably mounted in a counterbore 54 that is coaxial with a bore 55 that extends through a wall 56 of the end member 20.

As shown in FIG. 2, opening at the junction of the right-hand end of bore 50 and the left-hand end of counterbore 32 is one end of a passageway 57 that extends through the end member 28, casing 5 and end member 20 and at its opposite end opens at the left-hand end of a release valve mechanism.

The construction of this release valve mechanism may be identical to the construction of the hereinbefore-mentioned supply valve mechanism. Therefore, the elements of this release valve mechanism will be denoted by the same numerals as the corresponding elements of the supply valve mechanism with the addition of the letter a.

As shown in FIG. 2, the spherical member 39a of the release valve mechanism abuts the left-hand face of the piston 14 while this piston occupies its neutral position in which it is shown. Consequently, upon movement of the pistons 14 and 22 and piston rod 13 in the direction of the left hand, as viewed in FIG. 2, from their neutral position in which they are shown, the piston 14 is effective via the spherical member 39a and valve stem 37a to unseat the valve 46a from the valve seat 41a.

Upon unseating of the valve 46a from the valve seat 41a, fluid under pressure will be released from the air spring 2 (FIG. 1) to atmosphere via pipe and passageway 49, left-hand end of counterbore 32, passageway 57, past unseated valve 46a, the interior of valve seat member 40a, counterbore 36a, bore 34a, counterbore 35a, chamber 19 and an exhaust passageway 59 in the end member 20 that at one end opens into the chamber 19 and at the other end is open to atmosphere.

Shifting of the pistons 14 and 22 and piston rod 13 in the direction of the right-hand, as viewed in FIG. 2, from the neutral position in which they are shown, is effected by a mechanism now to be described.

As shown in FIG. 2, a chamber 60 is provided in the end member 20 for receiving therein a cam 61 that is secured, as by a press fit, to a shaft 62 that extends through this chamber 60 and a pair of parallel spaced-apart walls of this chamber. The length of this shaft 62 is such that one end is anchored in one of these parallel walls and the other end extends beyond the other wall for a purpose hereinafter made apparent.

In order to enable removal of the cam 61 from the chamber 60 should this cam become warn or otherwise damaged, a removable top cover 63 is secured to the end member 20 by a plurality of cap screws 64, two of which appear in FIG. 2 of the drawings.

As shown in FIG. 2, the periphery of the cam 61 abuts a roller 65 that is rotatably mounted on a pin 66 the opposite ends of which are anchored in the jaws of a clevis 67 that is integral with the lower end of a lever 68. The upper end of the lever 68 is provided with a second clevis 69 in the jaws of which are anchored the opposite ends of a pin 70 that extends through a fulcrum member 71 which is formed integral with the end member 20. Thus, the roller 65 is rockably suspended from the end member 20 so as to be disposed between the cam 61 and the left-hand end of an operating rod 72 that extends through the bore 55 and is integral with the spring seat 53.

In order to effect rocking of the cam 61 and shaft 62 in one direction or in an opposite direction to cause unseating of the valve 46 of the supply valve mechanism or the valve 46a of the release valve mechanism via operating rod 72, spring seat 53, spring 52, pistons 14 and 22 and piston rod 13, one end of an opeerating member or arm 73 is suitably secured to that portion of the shaft 62 that extends beyond the other wall of the pair of parallel spaced-apart walls of the chamber 60 and, therefore, outside of this chamber. As shown in FIG. 1, the other end of the operating arm 73 is provided with a clevis in the opposite jaws of which is a bore for receiving one end of a pin 74 that operatively connects this arm 73 to one end of a link 75. The other end of this link 75 is pivotally connected to the truck side frame 4 by any suitable means such as, for example, a pin 76.

In order to permit filling of the chambers 18 and 26 with a suitable hydraulic fluid such as, for example, oil, the casing 5 is provided with a screw-threaded bore 77 that opens into the chamber 26 and receives a screw-threaded plug 78 which, when removed, enables the spout of an oil can to be inserted into the bore 77 for filling the chambers 18 and 26 with oil.

It will be noted from FIG. 2 that the diameter of the bore 10 is slightly greater than the diameter of the piston rod 13 that extends through this bore 19. Consequently, oil supplied to the chamber 26 may flow through the bore 10 to the chamber 18 until the chamber 26 and also the chamber 18 are completely filled with oil.

OPERATION — FIGS. 1 AND 2

Assume initially that there is sufficient fluid under pressure in the air spring 2 (FIG. 1) so that the sprung portion or bolster 3 of the vehicle is supported at the desired preselected height relative to the unsprung portion or truck side frame 4. Consequently, as shown in FIG. 2, the valve 46 of the supply valve mechanism is seated on the valve seat 41 by the spring 43, and the valve 46a of the release valve mechanism is seated on the valve seat 41a by the spring 43a. Therefore, the supply pipe and passageway 30 is cut off from the delivery passageway and pipe 49, and this delivery passageway and pipe 49 and passageway 57 are cut off from the chamber 19 which is open to atmosphere via the passageway 59.

Consequently, the springs 51 and 52 are effective to bias the pistons 19 and 22 and the piston rod 13 to their neutral position in which they are shown in FIG. 2 of the drawings.

If now the load on the sprung portion or bolster 3 is increased, this bolster and, therefore, the casing 5, end members 20 and 28, and shaft 62 will descend below the aforementioned preselected height relative to the unsprung portion or truck side frame 4. As shaft 62 moves vertically downward, operating rod 73 will be caused to swing clockwise relative to the link 75 (FIG. 1) and thereby rotate shaft 62 and cam 61 clockwise for causing this cam 61 to swing the lever 68 and roller 65 carried thereby counterclockwise as this roller 65 travels along the surface of the cam 61, it being apparent from FIG. 2 that the distance between the center of the shaft 62 and the point of contact between the roller 65 and this cam surface increases as the cam 61 is rotated clockwise.

As the lever 68 is thus swung counterclockwise, the roller 65 carried thereby transmits a force to the spring seat 53 via the operating rod 72 to shift this rod 72 and spring seat 53 in the direction of the right hand, as viewed in FIG. 2, to increase the force on the spring 52 which, in turn, transmits a force to the piston 14.

When the force transmitted to the piston 14 is increased sufficiently to overcome the static friction of the pistons 14 and 22 and the yielding resistance of the spring 51, these pistons 14 and 22 and the piston rod 13 are shifted in the direction of the right hand to transmit a force through the spherical member 39 and valve stem 37 to cause unseating of valve 46 from its seat 41.

Upon unseating of valve 46 from its seat 41, fluid under pressure will flow from the supply reservoir 31 (FIG. 1) to the air spring 2 via pipe and passageway 30, counter bore 32 (FIG. 2), past unseated valve 46, interior of valve seat member 40, counterbore 36, bore 34, counterbore 35 and passageway and pipe 49. As pressure in the air spring 1 (FIG. 1) increases, the bolster 3 will rise and through the medium of link 75 and operating arm 73 rock shaft 62 and cam 61 counterclockwise. As the cam 61 is thus rocked counterclockwise, the distance between the center of the shaft 62 and the point of contact between the roller 65 and the cam surfce of this cam 61 decreases thereby reducing the force on the spring 52 so that this spring is rendered effective to shift the spring seat 53 and operating rod 72 in the direction of the left hand to cause clockwise rocking of the lever 68 and roller 65 so that this roller 65 remains pressed against the cam surface of the cam 61.

As the force on the spring 52 is thus reduced, the spring 51 is rendered effective to shift pistons 14 and 22 and piston rod 13 in the direction of the left hand. As the end of the piston rod 13 is thus moved away from the spherical member 39, the spring 43 is rendered effective to seat the valve 46 on its seat 41 thereby terminating the supply of fluid under pressure to the air spring 2.

If the load on the sprung portion is decreased, then the bolster 3 and, therefore, the casing 5, end members 20 and 28, and shaft 62 will ascend. As shaft 62 moves vertically upward, operating rod 73 will be caused to swing counterclockwise and thereby rotate shaft 62 and cam 61 counterclockwise so that the distance between the center of the shaft 62 and the point of contact between the roller 65 and the cam surface of the cam 61 decreases as this cam is rotated counterclockwise.

As the cam 61 is thus rotated counterclockwise, the force transmitted to the spring 52 via roller 65, operating rod 72 and spring seat 53 is reduced. Therefore, when the force of the spring 52 is reduced to a value less than the force of the spring 51, this spring 51 will shift pistons 22 and 14 and piston rod 13 in the direction of the left hand.

As the piston 14 is thus shifted in the direction of the left hand, it transmits a force through the spherical member 39a and valve stem 37a to cause unseating of valve 46a of the release valve mechanism from its seat 41a.

Upon unseating of valve 46a from its seat 41a, fluid under pressure will be released from the air spring 2 (FIG. 1) to atmosphere via pipe and passageway 49 (FIG. 2), passageway 57, past unseated valve 46a, interior of valve seat member 40a, counterbore 36a, bore 34a, counterbore 35a, chamber 19 and exhaust passageway 59. As the pressure in the air spring 2 (FIG. 1) decreases, the bolster 3 will descend and through the medium of the link 75 and operating arm 73 rock shaft 62 and cam 61 clockwise with the result that the distance between the center of the shaft 62 and the point of contact between the roller 65 and the cam surface of the cam 61 will increase to cause the lever 68 and roller 65 carried thereby to be rocked counterclockwise about the pin 70.

As the roller 65 is thus rocked counterclockwise, it transmits a force through the operating rod 72, spring seat 53 and spring 52 to cause the pistons 14 and 22 and piston rod 13 to shift in the direction of the right hand.

As the piston 14 is shifted in the direction of the right hand away from the spherical member 39a of the release valve mechanism, the spring 43a is rendered effective to seat valve 46a on its seat 41a thereby terminating the release of fluid under pressure from the air spring 2 (FIG. 1).

It will be noted from FIG. 2 that upon shifting of the pistons 14 and 22 and piston rod 13 in the direction of the right hand, the hydraulic fluid in the chamber 18 is forced to flow therefrom and to the chamber 26 via the annular space between the periphery of the piston rod 13 and the wall surface of the bore 10. It is, therefore, apparent that this annular space constitutes a restriction or choke which is effective to slow down or limit the rate at which the pistons 14 and 22 can shift in the direction of the right hand. It is likewise apparent that this restriction limits the rate at which these pistons 14 and 22 can shift in the direction of the left hand.

During movement of the vehicle in a substantially horizontal path, such as along a railway track, the bolster 3 will oscillate vertically or "bounce" to a slight degree. In view of the foregoing, it is apparent that this vertical movement of the bolster 3 produces corresponding rocking of the shaft 62 and cam 61.

In that the rate of movement of pistons 14 and 22 is limited, as above explained, to isolate vehicle oscillations, spring 52 is effective to accommodate movement of rod 72 and spring seat 53 by cam 61 relative to pistons 14 and 22 during such oscillations, since a direct connection between these parts would result in breakage.

Since the spring 52 provides a resilient connection through which the cam 61 transmits a force to the pistons 14 and 22, and the flow of oil between the chambers 18 and 26 is restricted in the manner explained above, it is apparent that the slight vertical movements of the bolster 3 as the vehicle travels along a railway track produce little or no change in the pressure of the fluid in the air spring 2 (FIG. 1) and, therefore, little or no change in the height or vertical distance between the bolster 3 and the rails of the track.

Figure 3:
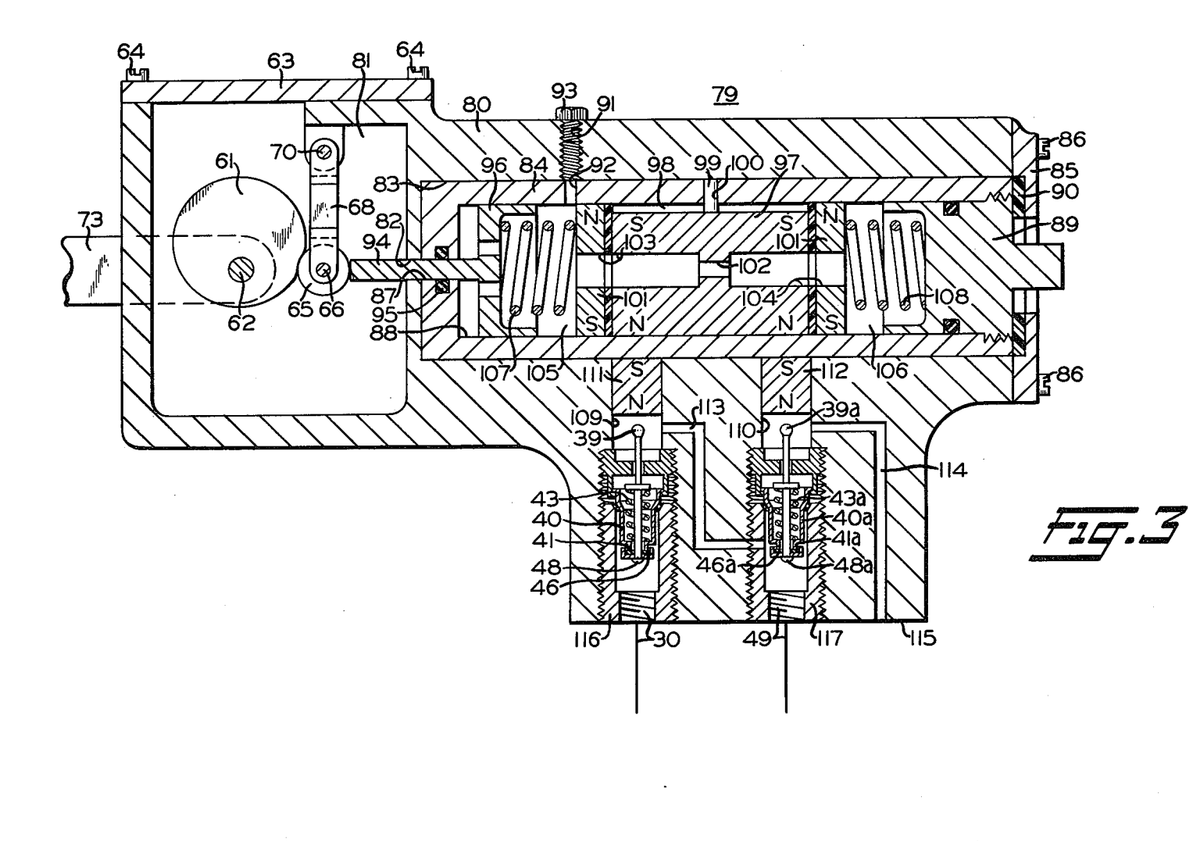
FIG. 3 is an enlarged vertical sectional view of a control valve device of the type shown in outline in FIG. 1 and constituting a second embodiment of the invention.

DESCRIPTION — FIG. 3

In FIG. 3 of the drawings, there is shown a magnet-type control valve device 79 constructed in accordance with a second embodiment of the invention. According to this second embodiment of the invention, the magnet-type control valve device 79 differs from the control valve device 1 in that permanent magnets are used for actuating the supply and release valve mechanisms which are identical in construction and operation to the supply and release valve mechanisms shown in FIG. 1. Accordingly, like reference numerals have been used to designate the structure shown in FIG. 3 which is identical to that shown in FIGS. 1 and 2. Only such features of the structure and operation of the embodiment of the invention shown in FIG. 3 which differ from that of the embodiment of FIGS. 1 and 2 will be hereinafter described.

According to the embodiment of the invention disclosed in FIG. 3, the magnet-type control valve device 79 comprises a casing 80 that is provided with a chamber 81 for rockably mounting therein the cam 61 and lever 68 in the same manner as in the chamber 60 shown in FIG. 2.

As shown in FIG. 3, the casing 80 is further provided with a bore 82 that at one end opens into the chamber 81 and at the other end into a coaxial counterbore 83 into which is press-fitted a bushing 84 that may be made of a hard anodized synthetic resin polymer sold under the trademark Teflon and coated with an aluminum coating. This bushing 84 is retained in the counterbore 83 by an annular cover plate 85 which is secured to the right-hand end of the casing 80 by a plurality of cap screws 86 two of which appear in FIG. 3.

The bushing 84 is provided with a bore 87 and a coaxial counterbore 88 that adjacent its right-hand end is provided with internal screw threads that have screw-threaded engagement with external screw threads provided on a plug 89 that serves to close the open end of counterbore 88. A gasket 90 is interposed between the plug 89 and the cover plate 85 to prevent leakage of hydraulic fluid from the interior of the counterbore 88.

In order to permit filling the interior of the counterbore 88 with a hydraulic fluid, such as, for example, oil, the casing 80 is provided with a screw-threaded bore 91 that is coaxial with a smooth bore 92 which extends through the bushing 84 and opens into the counterbore 88 intermediate the ends thereof. The screw-threaded bore 91 receives therein a screw-threaded plug 93 which, when removed, enables the spout of an oil can to be inserted into this bore 91 for filling the interior of the counterbore 88 with oil.

As shown in FIG. 3, an operating rod 94 extends through the bore 87 in the bushing 84, there being an O-ring seal 95 that surrounds this rod 94 and is disposed in an annular groove formed in the wall of the bore 87 to prevent leakage of hydraulic fluid from the interior of the counterbore 88 to the chamber 81. The right-hand end of the operating rod 94 is formed integral with a perforated cup-shaped spring seat 96 that is slidably mounted in the counterbore 88.

Slidably mounted in the counterbore 88 between the spring seat 96 and the plug 89 is a permanent magnet 97 that has a groove 98 therein for receiving with a sliding fit one end of a guide pin 99 that is press-fitted into a bore 100 provided therefor in the bushing 84. This guide pin 99 prevents rotation of the permanent magnet 97 within the counterbore 88.

The permanent magnet 97 has a south pole at its top and a north pole at its bottom and has secured to its respective opposite ends, as by an opoxy resin, a permanent magnet 101. Each of these permanent magnets 101 has a north pole and a south pole, the north pole of each of these permanent magnets 101 being disposed adjacent the south pole of the permanent magnet 97 whereby the south pole of each of these magnets 101 is disposed adjacent the north pole of the permanent magnet 97.

As shown in FIG. 3, the permanent magnet 97 is provided with a central bore 102 that at its respective opposite ends opens into coaxial counterbores 103 and 104 which extend through this permanent magnet 97 and also the respective permanet magnet 101.

The diameter of the bore 102 is so selected that this bore 102 constitutes a choke for controlling the rate of flow of oil between a chamber 105 formed by the cooperative relationship of the spring seat 96 and the left-hand permanent magnet 101 and a chamber 106 formed by the cooperative relationship of the plug 89 and the right-hand permanent magnet 101.

In order to normally bias the permanent magnet 97 and the two permanent magnets 101 secured to the respective opposite ends thereof to a neutral position in which they are shown in FIG. 2, a first spring 107 is disposed in the chamber 105 and is interposed between the spring seat 96 and the left-hand permanent magnet 101, and a second spring 108 is disposed in the chamber 106 and is interposed between the plug 89 and the right-hand permanent magnet 101.

As shown in FIG. 3 of the drawings, the casing 80 is provided with two parallel space-apart bores 109 and 110, it being noted that the axes of these bores 109 and 110 are perpendicular to the axis of the bore 87. Slidably mounted in the bore 109 is a permanent magnet 111 and slidably mounted in the bore 110 is a permanent magnet 112, it being noted that these magnets are so disposed in these bores that the south pole of each magnet is at the top or adjacent the north pole of the permanent magnet 97 while it occupies its neutral position in which it is shown in FIG. 3.

Since the bushing 84 may be made of a hard anodized synthetic resin polymer sold under the trademark Teflon and coated with an aluminum coating, this bushing 84 is non-magnetic. Therefore, it is apparent that the north pole of the permanent magnet 97 attracts the south pole of the permanent magnets 111 and 112 so that these magnets 111 and 112 are maintained in the upper end of the bores 109 and 110 in abutting relationship with the periphery of the bushing 84 so long as the permanent magnet 97 occupies its neutral position in which it is shown in FIG. 3.

As shown in FIG. 3, opening at the wall surface of the bore 109 just beneath the lower end of the permanent magnet 111 is one end of a passageway 113 that extends through the casing 80 and at its other end opens at the wall surface of the bore 110 intermediate the ends thereof.

Opening at the wall surface of the bore 110 just beneath the lower end of the permanent magnet 112, while it occupies the position shown in FIG. 3, is one end of an exhaust passageway 114 that extends through the casing 90 and at its other end opens at a surface 115 on the bottom of this casing.

The portion of the bore 109 below the location at which the one end of passageway 113 opens at the wall surface of this bore is provided with internal screw threads for receiving a supply valve mechanism that is identical with the supply valve mechanism of the control valve device 1 shown in FIG. 2.

Likewise, the portion of the bore 110 below the location at which the one end of passageway 114 opens at the wall surface of this bore is provided with internal screw threads for receiving an exhaust valve mechanism that is identical with the exhaust valve mechanism of the control valve device 1 shown in FIG. 2. Therefore, the elements of these valve mechanisms are denoted by the same numerals as the corresponding elements of the supply and release valve mechanisms shown in FIG. 2.

A screw-threaded plug 116 to which the pipe 30 is connected closes the lower end of the bore 109, and a screw-threaded plug 117 to which the pipe 49 is connected closes the lower end of the bore 110.

OPERATION — FIG. 3

Assume initially that there is sufficient fluid under pressure in the air spring 2 (FIG. 1) so that the bolster 3 is supported at the desired preselected height. Therefore, the valve 46 of the supply valve mechanism and the valve 46a of the exhaust valve mechanism of the magnet-type control valve device 79 shown in FIG. 3 are closed so that the delivery pipe and passageway 49 is cut off from both the supply pipe and passageway 30 and the exhaust passageway 114.

It may be further assumed that the springs 107 and 108 bias the permanent magnets 97 and 101 to the neutral position shown in FIG. 3.

If now the load on the sprung portion or bolster 3 is increased, the shaft 62 and cam 61 will be rotated clockwise in the same manner as hereinbefore described for the first embodiment of the invention.

This clockwise rotation of cam 61 is effective to swing lever 68 and roller 65 counterclockwise thereby shifting operating rod 94 and spring seat 96 in the direction of the right hand, as viewed in FIG. 3.

This shifting of the spring seat 96 transmits a force through the yielding resistance of the spring 107 to the permanent magnet 101 secured to the left-hand end of the permanent magnet 97 to cause shifting of this permanent magnet 97 and the two permanent magnets 101 secured to the respective opposite ends thereof in the direction of the right hand from the neutral position in which they are shown in FIG. 3.

As the permanent magnets 97 and 101 are shifted in the direction of the right hand from the position shown in FIG. 3, the permanent magnet 101 secured to the left-hand end of the permanent magnet 97 is shifted to a position in which this permanent magnet 101 is disposed directly above the permanent magnet 111.

When the permanent magnet 101 that is secured to the left-hand end of the permanent magnet 97 is disposed directly above the permanent magnet 111, the south pole of this permanent magnet 101 will repel the south pole of the permanent magnet 111 to cause this magnet 111 to be shifted downward within the bore 109.

As the permanent magnet 111 is thus shifted downward within the bore 109, the lower end of this magnet 111 will be moved into contact with the spherical member 39 of the supply valve mechanism. Further downward shifting of the magnet 111 is effective to unseat the valve 46 from its seat 41.

Upon unseating of valve 46 from its seat 41, fluid under pressure will flow from the supply reservoir 31 (FIG. 1) to the air spring 2 to increase the pressure therein.

This increase of the pressure in the air spring 2 is effective to cause the bolster 3 to rise which in turn effects counterclockwise rocking of the cam 61 to thereby reduce the force on the spring 107. As the force on the spring 107 is thus reduced, the spring 108 is rendered effective to shift the permanent magnets 97 and 101 in the direction of the left hand, as viewed in FIG. 3, until they are returned to the neutral position shown.

Upon return of the permanent magnet 97 to the position shown in FIG. 3, the north pole of this magnet 97 will attract the south pole of the permanent magnet 111 whereupon this magnet will rise in the bore 109 until it is returned to the position shown in FIG. 3 in which position its upper end abuts the bushing 84 and its lower end is disposed above the spherical member 39 of the supply valve mechanism.

As the permanent magnet 111 is thus returned to the position shown in FIG. 3, the spring 43 is rendered effective to seat valve 46 on its seat 41 thereby terminating the supply of fluid under pressure to the air spring 2.

If the load on the sprung portion is decreased, the bolster 3 and magnet-type control valve device 79 carried thereon will ascend to thereby move the shaft 62 vertically upward to cause counterclockwise rocking of the cam 61.

This counterclockwise rocking of the cam 61 is effective to reduce the force transmitted to the spring 107. Consequently, upon the force of the spring 107 being reduced to a value less than the force of the spring 108, this spring 108 will shift the permanent magnets 97 and 101 in the direction of the left hand from the neutral position in which they are shown in FIG. 3.

As the permanent magnets 97 and 101 are thus shifted in the direction of the left hand from the position shown in FIG. 3, the permanent magnet 101 secured to the right-hand end of the permanent magnet 97 is shifted to a position in which it is disposed directly above the permanent magnet 112.

When the permanent magnet 101 secured to the right-hand end of the permanent magnet 97 is disposed directly above the permanent magnet 112, the south pole of this permanent magnet 101 will repel the south pole of the permanent magnet 112 to cause this magnet 112 to be shifted downward within the bore 110.

As the permanent magnet 112 is thus shifted downward within the bore 110, it will first contact spherical member 39a of the release valve mechanism and thereafter effect unseating of the valve 46a from its seat 41a.

Upon unseating of valve 46a from its seat 41a, fluid under pressure will be released from the air spring 2 (FIG. 1) to atmosphere via the passageway 114 (FIG. 3). As the pressure in the air spring 2 decreases, the bolster 3 descends to rock shaft 62 and cam 61 clockwise and thereby increase the force on the spring 107 to cause the permanent magnets 97 and 101 to be shifted in the direction of the right hand. When the permanent magnet 97 reaches its neutral position in which it is shown in FIG. 3, its north pole will attract the south pole of the permanent magnet 112 so that this magnet 112 is shifted upward in the bore 110 to the position shown in FIG. 3 whereupon spring 43a seats valve 46a on its seat 41a thereby terminating the release of fluid under pressure from the air spring 2 (FIG. 1).

It will be noted from FIG. 3 that, upon shifting of the permanent magnets 97 and 101 in either direction, hydraulic fluid flows at a restricted rate through the small bore 102 and counterbores 103 and 104. This restricted flow limits the rate at which these permanent magnets can be shifted from one position to another during vehicle oscillations, while spring 107 acommodates movement of rod 94 and spring seat 96 by cam 61 relative to magnet 97. Consequently, it is apparent that slight vertical movements of the bolster 3 produce little or no change in the pressure of the air spring 2 and therefore little or no change in the height or vertical distance between the bolster 3 and the rails of the track as is the case with the first embodiment of the invention shown in FIGS. 1 and 2.

Figure 4:
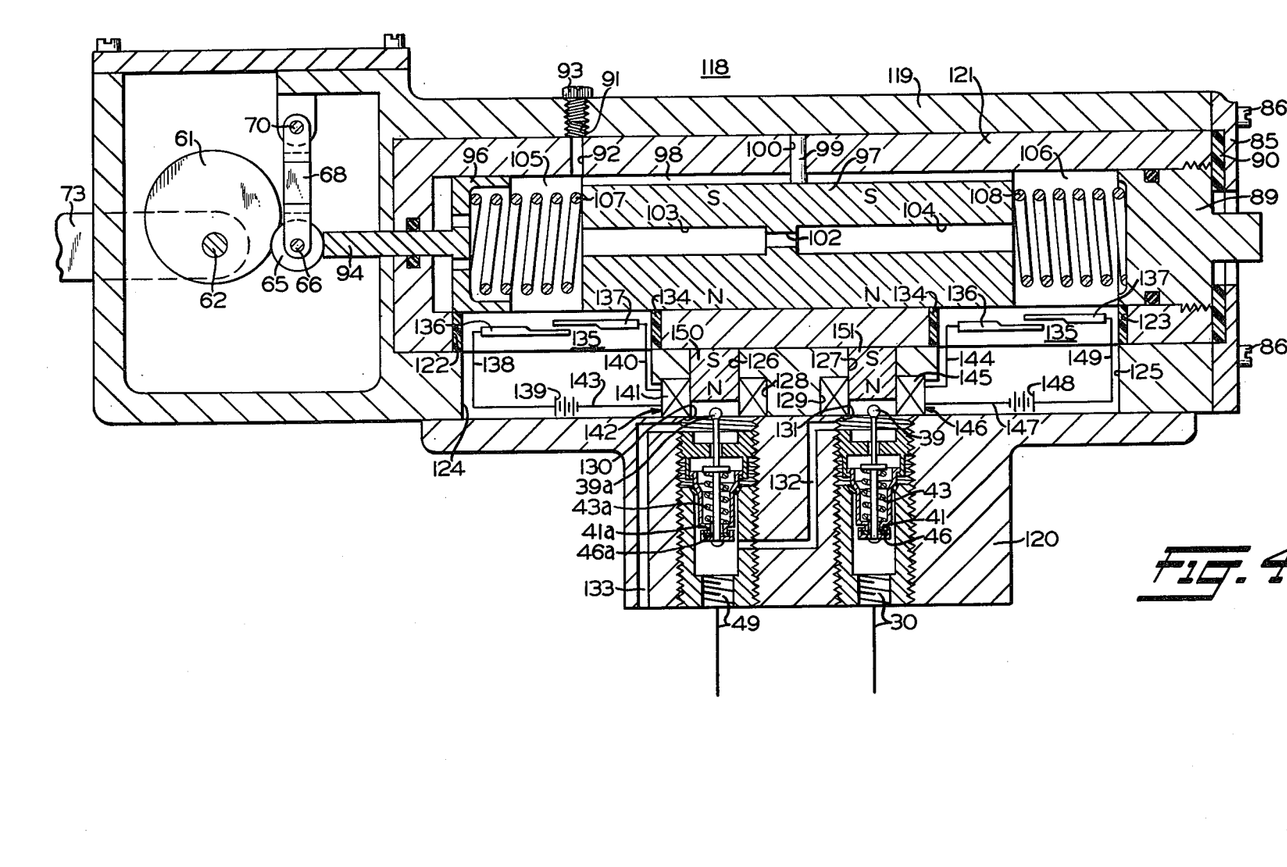
FIG. 4 is an enlarged vertical sectional view of a control valve device of the type shown in outline in FIG. 1 and constituting a third embodiment of the invention.

DESCRIPTON — FIG. 4

In FIG. 4 of the drawings, there is shown an electromagnetic-type control valve device 118 constructed in accordance with a third embodiment of the invention. According to this third embodiment of the invention, the electro-magnet-type control valve device 118 differs from the magnet-type control valve device 79 shown in FIG. 3 in that the permanent magnets which operate the supply and release valve mechanisms are the plungers of solenoids, the coils of which are supplied with current from some suitable electrical power source, such as, for example, a battery, via a circuit that includes a reed-type switch which is actuated to a closed position in response to the shifting of a permanent magnet in one direction or in an opposite direction out of a neutral position. Accordingly, like reference numerals have been used to designate the structure shown in FIG. 4 which is identical to that shown in FIG. 3. Only such features of the structure and operation of the embodiment of the invention shown in FIG. 4 which differ from that of the embodiment of FIG. 3 will be hereinafter described.

According to the embodiment of the invention disclosed in FIG. 4, the permanent magnet 97 does not have the two permanent magnets 101 secured to its respective opposite ends, as shown in FIG. 3, since the function of these permanent magnets 101 is performed by solenoids now to be described.

As shown in FIG. 4, the electro-magnetic control valve device 118 comprises a pair of casing sections 119 and 120, the casing section 120 being secured to the bottom of the casing section 119 by any suitable means (not shown).

A bushing 121, which replaces the bushing 84 shown in FIG. 3, is provided with a pair of spaced-apart bores 122 and 123 which, as shown in FIG. 4, are in alignment with a second pair of bores 124 and 125 of smaller diameter provided in the casing section 117, it being noted that one end of these bores 124 and 125 is closed by the casing section 120.

Furthermore, the casing section 119 is provided with a pair of bores 126 and 127 and a pair of coaxial counterbores 128 and 129 that are coaxial with a pair of bores 130 and 131 that may be formed, as by a drilling operation, in the casing section 120, it being noted that this casing section 120 is also provided with a pair of passageways 132 and 133 that serve the same purpose as the passageways 113 and 114 shown in FIG. 3.

The bores 130 and 131 are provided with internal screw threads for receiving therein respectively a release valve mechanism and a supply valve mechanism that are identical to the supply and release valve mechanisms of the control valve devices 1 and 79.

As shown in FIG. 4, disposed in each of the bores 122 and 123 is a bushing 134 that is constructed of some suitable nonmagnetic material such as, for example, bakelite. Disposed in each of these bushings 134 is a limit or reed-type switch 135 each of which comprise a pair of normally open contacts 136 and 137.

The contact 136 of the left-hand limit switch 135 is connected by a wire 138 to the positive terminal of a source of electrical power such as, for example, a first battery 139, and the contact 137 of this limit switch is connected by a wire 140 to one end of a coil 141 of a first solenoid 142. This coil 141 is disposed within the hereinbefore-mentioned counterbore 128 in the casing section 119 and has its other end connected by a wire 143 to the negative terminal of the battery 139.

The contact 136 of the right-hand limit switch 135 shown in FIG. 4 is connected by a wire 144 to one end of a coil 145 of a second solenoid 146. This coil 145 is disposed within the hereinbefore-mentioned counterbore 129 in the casing section 119 and has its other end connected by a wire 147 to the negative terminal of a second battery 148, the positive terminal of which is connected by a wire 149 to the contact 137 of the right-hand limit switch 135. It should be understood that the two batteries 139 and 138 may be replaced by a single source of electrical power, if desired.

In addition to the coil 141, the first solenoid 142 further comprises an armature 150 which may be in the form of a cylindrical permanent magnet that is slidably mounted within the coil 141 and has a south pole at its upper end and a north pole at its lower end.

Likewise, the second solenoid 146 further comprises an armature 151 which also may be in the form of a cylindrical permanent magnet that has a sourth pole at its upper end and a north pole at its lower end.

OPERATION — FIG. 4

As in the second embodiment of the invention, assume initially that there is sufficient fluid under pressure in the air spring 2 (FIG. 1) so that the bolster 3 is supported at the desired preselected height. Therefore, the valve 46 of the supply valve mechanism and the valve 46a of the exhaust valve mechanism of the electro-magnetic control valve device 118 shown in FIG. 4 are closed so that the delivery pipe and passageway 49 is cut off from both the supply pipe and passageway 30 and the exhaust passageway 133.

It may be further assumed that the springs 107 and 108 bias the permanent magnet 97 to the neutral position shown in FIG. 4. Therefore, the north pole of this permanent magnet 97 is effective to attract the south pole of the permanent magnets 150 and 151 so that these permanent magnets abut the bushing 121, as shown in FIG. 4.

If now the load on the bolster 3 is increased, the spring seat 96 will transmit a force through the yielding resistance of the spring 107 to the permanent magnet 97, in the same manner as hereinbefore described for the second embodiment of the invention shown in FIG. 3. This force causes the permanent magnet 97 shown in FIG. 4 to be shifted in the direction of the right hand from the neutral position in which it is shown.

Therefore, this permanent magnet 97 shown in FIG. 4 is shifted in the direction of the right hand to a position in which its north pole is effective to cause closing of the contacts 136 and 137 of the right-hand reed-type switch 135.

Upon closing of the contacts 136 and 137 of the right-hand reed-type switch 135, a power supply circuit is established for supplying current to the coil 145 of the solenoid 146. This circuit extends from the positive terminal of the battery 148 to the negative terminal of this battery via wire 149, contacts 136 and 137 of the right-hand reed-type switch 135, wire 144, the windings of coil 145 of solenoid 146 and wire 147.

When current is thus supplied to the coil 145 of the solenoid 146, the permanent magnet 151, which constitutes the armature of this solenoid, is shifted downward by electro-magnetic force until its lower end abuts the spherical member 39 of the supply valve mechanism. As this permanent magnet 151 is shifted further in a downward direction by this electro-magnetic force, the valve 46 of the supply valve mechanism is unseated from its seat 41.

Upon unseating of valve 46 from its seat 41, fluid under pressure will flow from the supply reservoir 31 (FIG. 1) to the air spring 2 to increase the pressure therein.

This increase of the pressure in the air spring 2 will cause the bolster 3 to rise which in turn effects counterclockwise rocking of the cam 61 to thereby reduce the force on the spring 107. The spring 108 will then shift the permanent magnet 97 in the direction of the left hand to its neutral position shown in FIG. 4 whereupon the contacts 136 and 137 of the right-hand reed-type switch 135 will open since they are no longer held closed by the magnetic attraction of the permanent magnet 97.

Opening of these contacts 136 and 137 cuts off the supply of current to the coil 145 of the solenoid 146 so that the permanent magnet or armature 151 of this solenoid 146 is no longer subject to electro-magnetic force. Consequently, the spring 43 will now seat the valve 46 on its seat 41 thereby terminating the supply of fluid under pressure to the air spring 2 (FIG. 1).

If the load on the sprung portion is decreased, the bolster 3 and electro-magnetic control valve device 118 carried thereon will ascend to thereby cause counterclockwise rocking of the cam 61 which is effective to reduce the force transmitted to the spring 107. Consequently, the spring 108 will shift the permanent magnet 97 in the direction of the left hand from its neutral position to cause closing of the contacts 136 and 137 of the left-hand reed-type switch 135 thereby effecting the supply of current from the battery 139 to the coil 141 of the solenoid 142.

When current is thus supplied to the coil 141 of the solenoid 142, the armature 150 of this solenoid will be shifted downwardly by electro-magnetic force to cause unseating of the valve 46a of the release valve mechanism from its seat 41a.

Upon unseating of valve 46a from its seat 4a, fluid under pressure will be released from the air spring 2 (FIG. 1) via the passageway 133 (FIG. 4). As the pressure in the air spring 2 decreases, the bolster 3 descends to rock cam 61 clockwise and thereby increase the force on the spring 107 to cause the permanent magnet 97 to be shifted in the direction of the right hand to its neutral position.

Upon the return of the permanent magnet 97 to its neutral position, the contacts 136 and 137 of the left-hand reed-type switch 135 will open thereby cutting off the supply of current to the coil 141 of the solenoid 142 so that its armature 150 is no longer subject to an electro-magnetic force.

The spring 43a will now effect seating of valve 46a on its seat 41a thereby terminating the release of fluid under pressure from the air spring 2 (FIG. 1).

It will be noted from FIG. 4 that, upon shifting of the permanent magnet 97 in either direction, hydraulic fluid flows through the small bore 102 at a restricted rate which limits the rate at which this permanent magnet 97 can be shifted from one position to another during vehicle oscillations, while spring 107 accommodates movement of rod 94 and spring seat 96 by cam 61 relative to magnet 97. Consequently, slight vertical movements of the bolster 3 produce little or no change in the pressure in the air spring 2 and therefore little or no change in the vertical distance between the bolster 3 and the rails of the track as is the case with the first and second embodiments of the invention.

Having now described the invention, what I claim as new and desire to secure by Letters Patent, is:

1. A control valve device for so controlling the pressure of a fluid in an air spring between the sprung and unsprung portions of a vehicle as to support the sprung portion at a substantially constant preselected height above the unsprung portion irrespective of the load carried by the sprung portion, said control valve device comprising:
    (a) a casing having a plurality of bores therein, said casing being attached to the sprung portion;
    (b) a supply and a release valve mechanism each having a valve operating stem for effecting the operation thereof, whereby operation of said supply valve mechanism causes the supply of fluid under pressure to the air spring and operation of said release valve mechanism causes the release of fluid under pressure from the air spring to atmosphere;
    (c) a cam rockably mounted with respect to said casing and rockable in one direction or in an opposite direction in response to a deflection of said sprung portion as the vehicle load is increased or decreased;
    (d) actuator means movable in one direction in response to rocking of said cam in said one direction for actuating the valve stem of said supply valve mechanism to cause the supply of fluid under pressure to the vehicle air spring, and movable in an opposite direction in response to rocking of said cam in said opposite direction for actuating the stem of said release valve mechanism to cause the release of fluid under pressure from said air spring;
    (e) means for limiting the rate of movement of said actuator means in said one and said opposite directions, said rate being chosen to reflect the rate of deflection of the vehicle sprung portion resulting from a load change; and
    (f) a pair of resilient means, one being interposed between said cam and said actuator means and the other interposed between said casing and said actuator means whereby said movable means is urged in said one direction or in said opposite direction accordingly as said cam is rocked in said one direction or in said opposite direction, said one of said pair of resilient means further providing for rocking of said cam when the rate of deflection of the vehicle sprung portion is such as to exceed the limiting rate of movement of said actuator means.

2. The control valve device recited in claim 1, further characterized by a pair of chambers, one disposed at each end of said actuator means and filled with a hydraulic fluid, and a flow restricting means for limiting the rate of flow of said fluid from either one of said chambers to the other.

3. A control valve device, as recited in claim 1, further characterized by a pair of chambers, one disposed at each end of said actuator means and filled with a hydraulic fluid, and a flow restricting means carried by said actuator means for limiting the rate of flow of said hydraulic fluid from either one of said chambers to the other.

4. The control valve device recited in claim 1, further characterized in that said pair of resilient means comprises a pair of springs.

5. The control valve device recited in claim 1, further characterized in that said actuator means comprises:
    a. a first piston,
    b. a second piston,
    c. a piston rod so connecting said pistons in spaced-apart relationship and cooperating therewith as to cause actuation of the valve stem of one of said valve mechanisms upon movement of said pistons in one direction and the actuation of the valve stem of the other of said valve mechanisms upon movement of said pistons in an opposite direction.

6. A control valve device, as recited in claim 1, further characterized in that said actuator means comprises:
    a. a first permanent magnet having a south pole and a north pole,
    b. a first pair of permanent magnets each having a south pole and a north pole, said first pair of permanent magnets being so connected to said first permanent magnet that the south poles thereof are disposed adjacent the north pole of said first permanent magnet and the north poles thereof are disposed adjacent the south pole of said first permanent magnet, and
    c. a second pair of permanent magnets each having a south pole and a north pole, said second pair of permanent magnets being so disposed that the respective south pole thereof is disposed adjacent the north pole of said first permanent magnet in one position thereof whereby movement of said first permanent magnet out of said one position in one direction causes the south pole of one of said first pair of permanent magnets to be disposed in a position in which the south pole thereof repels the south pole of one of said second pair of permanent magnets thereby enabling said one of said second pair of permanent magnets to actuate the valve stem of one of said valve mechanisms, and movement of said first permanent magnet out of said one position in a direction opposite said one direction causes the south pole of the other of said first pair of permanent magnets to be disposed in a position in which the south pole thereof repels the south pole of the other of said second pair of permanent magnets thereby enabling the other one of said second pair of permanent magnets to actuate the valve stem of the other one of said valve mechanisms.

7. The control valve device recited in claim 1, further characterized in that said actuator means comprises:
   a. a first permanent magnet having a south pole and a north pole,
   b. a pair of solenoids each having an armature operable to actuate the valve stem of one of said valve mechanisms,
   c. a source of electrical power,
   d. a circuit for controlling the supply of current from said source of electrical power to said pair of solenoids, and
   e. a pair of switches in said circuit, each having a pair of contacts effective when closed to cause the supply of current from said source of electrical power to one of said pair of solenoids, the pair of contacts of one of said pair of switches being so disposed as to be closed by the magnetic attraction of said permanent magnet upon movement thereof out of one position in one direction, and the pair of contacts of the other one of said pair of switches being so disposed as to be closed by the magnetic attraction of said permanent magnet upon movement thereof out of said one position in a direction opposite said one direction.

8. A control valve device, as recited in claim 5, further characterized in that actuation of one of said valve stems is effected by movement of one of said pistons and actuation of the other of said valve stems is effected by movement of said piston rod.

9. The control valve device recited in claim 6, further characterized in that said first pair of permanent magnets are connected to the respective opposite ends of said first permanent magnet by an epoxy resin.

10. A control device, as recited in claim 6, further characterized in that the axis of said first permanent magnet is so disposed with respect to the axes of said second pair of permanent magnets as to form a right angle therewith.

11. The control valve device recited in claim 7, further characterized in that the armature of each of said pair of solenoids comprises a permanent magnet having a south pole and a north pole, said south pole being disposed adjacent the north pole of said first permanent magnet so as to be attracted in the direction of said north pole of said first permanent magnet upon opening of the contacts of the switch controlling the circuit of the respective solenoid.

12. A control valve device, as recited in claim 7, further characterized in that said source of electrical power comprises a pair of batteries, each for supplying power to one of said pair of solenoids.

13. The control valve device recited in claim 7, further characterized in that a bushing constructed of a plastic material is disposed in one of said plurality of bores in said casing, and said first permanent magnet is slidably mounted in said bushing.

14. A control valve device, as recited in claim 7, further characterized in that said casing has a pair of counterbores each coaxial with one of said plurality of bores therein, and each of said pair of solenoids has a coil disposed in one of said pair of counterbores.

* * * * *